UNITED STATES PATENT OFFICE.

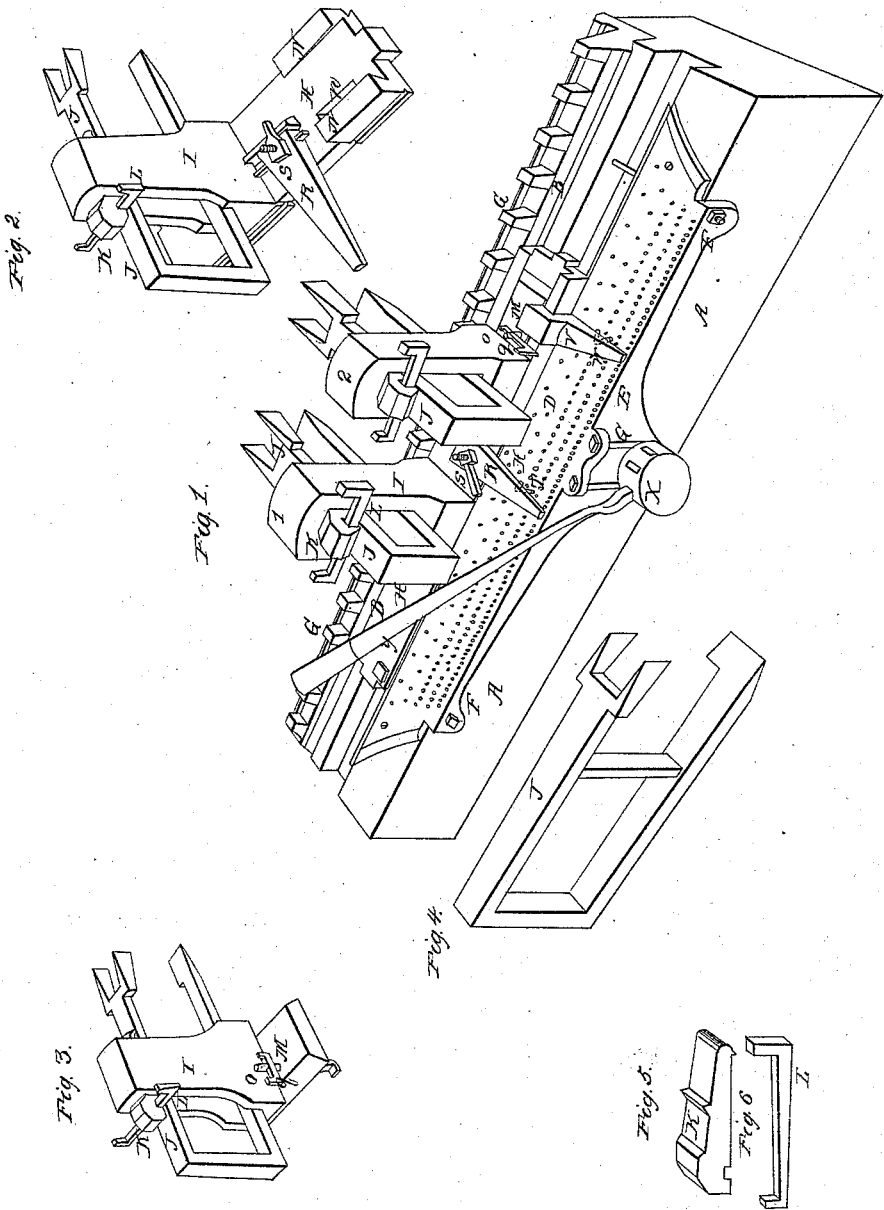

MARTIN RICH, OF FAIRFIELD, WISCONSIN.

SAWMILL.

Specification of Letters Patent No. 8,094, dated May 13, 1851.

*To all whom it may concern:*

Be it known that I, MARTIN RICH, of Fairfield, in the county of Dodge and State of Wisconsin, have made certain Improvements in the Manner of Constructing the Dogs for Sawmills and also in the manner of Setting the Logs to be Sawed; and I do hereby declare that the following is a full and exact description thereof.

In the accompanying drawing Figure 1 represents the tail block with the dog and setting apparatus on it. The head block is not shown as the setting apparatus is the same and the dog constructed in the same manner with only one dog on the rack working up to the saw with the usual bail dog on the opposite side of the saw. A A is the tail block; B B are two cast iron plates on the front of the block 2 feet long each, placed three inches apart for the saw to pass between, they are five inches wide in front fitted for the log to rest on with an elevation back rising two and a half inches with cogs or teeth as shown at C C with a projection as shown at B B, to fit into a groove in the plate on which the dog stands (to be described hereafter). D is a cast iron plate 4½ feet long eight inches wide on the back of the block with rows of holes in it graduated so as to regulate the thickness of the stuff sawed, as will be more fully described hereafter, the front edge fitted to the groove in the plate H on which the dog stands the two plates B and D holding the dog plate to its place and between which it works with a projection descending on the back side of the block as shown at E to hold two tightening screws F F, and a stirrup G to hold the pinion. H is a cast iron plate 2½ feet long seven inches wide with grooved edges. From this plate the standard I rises which is to contain the dog J. This standard is nine inches high and is cast in one piece with the plate. It has a mortise or opening between its cheeks or sides which is eight inches high and two and a half inches wide for the dog to slide in.

The dog is made in form of an oblong square frame six inches high fourteen inches long and to slide easily through the mortise in the standard. The dog is shown in Fig. 4. The dog is tightened by a piece of cast iron six inches long, 2½ inches wide and 2 inches thick which lies upon the top of the dog in the mortise in the standard as shown at K, Fig. 1. It has a projection on its top in the center which is fitted in a groove in the top of the mortise with a projection on its under side resting upon the dog in front of the standard and a notch in the back end to receive the key L which being driven in bears upon the dog and depresses the tightener in front and the dog is held thereby immovable in its place. This tightener is shown in Fig. 5, and the key in Fig. 6.

The standard No. 2 in Fig. 1 is not cast on the main plate H but is cast on a separate plate as shown at M, Fig. 3. This plate slides on the main plate in raised grooves on its edges as shown at N N, Fig. 2, and is made fast by a bolt O passing through it and through a slot in the main plate as seen at P, Fig. 2, with a head on the under side and a key through the top of the bolt, as shown at $q$ $q$ Figs. 1 and 3. The slot or opening through the main plate is made twelve inches long so that the standard No. 2 can move that distance on the main plate by loosening the key.

The plate H has a guide arm R. This is fastened on the plate by a bolt and hand nut as shown at S. This bolt passes through a slot in the main plate 2½ inches long so as to let the arm be movable to the right or left This arm slides over the plate D, and is made to control the distance the log is moved to saw the thickness desired by the iron pin T. This pin is moved when used the required distance and the dog is moved 'till the arm strikes the pin. The different rows of holes in plate D are made to vary from ⅜ to 2 inches; ⅛ inch increase up to one inch and from that to two inches they vary ½ an inch each row.

The object of the movable arm is to be able to change from one thickness to that of another without shifting the dog in the log. This is done by merely moving the arm to correspond with the row of holes representing the thickness to which you wish to change to. Plate M, Fig. 1, has a guide arm V. This is drawn as solid on the plate and may be made so or movable like the one on the main plate. This arm passes over the surface of plate D the same as the other arm R. When both dogs are used for holding the log No. 2 is made fast to the main plate H by the key $q$ when only one dog is used after the log is turned down No. 2 is loosened from the main plate and the dog is run out and used to hold up the boards in their places as they are sawed without leaving any stubshot and the boards are all kept standing on the carriage until the whole log is sawed. This is done in the following manner—when the log is turned down dog No. 1 is used to hold the log and after the slab is taken off, dog No. 2 is run out and placed so as to hold the first board when sawed without interfering with the saw. The pin at W is then moved the distance for the required thickness to be sawed, and as both dogs are moved when the guide arm V strikes the pin it stops dog No. 2 and it slides on the main plate so that the two dogs approach each other the thickness of the saw calf and the log is brought snug to the board. In this manner the whole log is sawed without any stupe short, and the boards are all kept standing in their place.

The main dog plate H has upon its under side a rack extending the whole length. This has a pinion meshing into it. The end of the pinion shaft is shown at X, Fig. 1, with a capstan head to receive the mill bar Y which is used as a lever in moving the main plate H, in setting the log and working the dog. When the log is set the guide arm is brought snug up to the pin and the bar is left resting at an angle so that its weight shall prevent the pinion from turning back and the log is thereby held solid in its place.

Having thus fully described the nature of my improvements and the manner in which they operate in producing the desired effect, what I claim as my invention is—

1. The tightener and key, and the manner in which they are used in tightening the dogs as herein set forth.

2. I claim the movable arm to regulate the thickness to be sawed when changing from one thickness to another in the same log without taking the dog out of the log as herein described.

3. I claim the placing the second dog upon the main plate and adjusted by the bolt and key, constructed in the form and manner and for the objects and purposes hereinbefore particularly set forth.

No other part of the said above described dogs do I in this my specification claim as new or original, excepting such as above enumerated.

Dodge county, Wisconsin Nov 15, 1850.

MARTIN RICH.

Attest:
HIRAM BARBER,
SAMUEL NOYES, 2d.